(12) United States Patent
Hueter

(10) Patent No.: US 8,788,445 B2
(45) Date of Patent: Jul. 22, 2014

(54) SYSTEM AND METHOD FOR QUANTIFYING AND DETECTING NON-NORMATIVE BEHAVIOR

(75) Inventor: Geoffrey J. Hueter, San Diego, CA (US)

(73) Assignee: Certona Corporation, San Diego, CA (US)

(*) Notice: Subject to any disclaimer, the term of this patent is extended or adjusted under 35 U.S.C. 154(b) by 668 days.

(21) Appl. No.: 12/416,819

(22) Filed: Apr. 1, 2009

(65) Prior Publication Data

US 2009/0248497 A1    Oct. 1, 2009

Related U.S. Application Data

(60) Provisional application No. 61/041,447, filed on Apr. 1, 2008.

(51) Int. Cl.
| | |
|---|---|
| *G06N 5/00* | (2006.01) |
| *G06F 17/00* | (2006.01) |
| *G06Q 30/02* | (2012.01) |
| *G06Q 30/00* | (2012.01) |
| *G06Q 10/00* | (2012.01) |
| *G06Q 30/06* | (2012.01) |
| *G06N 99/00* | (2010.01) |
| *H04L 12/58* | (2006.01) |

(52) U.S. Cl.
CPC ............ *G06Q 10/00* (2013.01); *G06Q 30/0201* (2013.01); *G06Q 30/0185* (2013.01); *G06Q 30/0269* (2013.01); *G06Q 30/0631* (2013.01); *G06Q 30/0255* (2013.01); *G06Q 30/00* (2013.01); *G06Q 30/0202* (2013.01); *G06N 99/005* (2013.01); *H04L 12/585* (2013.01)
USPC .............................................. 706/45; 709/206

(58) Field of Classification Search
USPC ........................................... 705/7.11; 706/45
See application file for complete search history.

(56) References Cited

U.S. PATENT DOCUMENTS

| | | | | |
|---|---|---|---|---|
| 6,421,709 | B1 * | 7/2002 | McCormick et al. | 709/206 |
| 2004/0054572 | A1 * | 3/2004 | Oldale et al. | 705/10 |
| 2005/0172278 | A1 * | 8/2005 | Kuch et al. | 717/158 |
| 2007/0038705 | A1 * | 2/2007 | Chickering et al. | 709/206 |
| 2007/0150470 | A1 * | 6/2007 | Brave et al. | 707/6 |

* cited by examiner

*Primary Examiner* — Matthew Gart
*Assistant Examiner* — Michael Maicher
(74) *Attorney, Agent, or Firm* — Richard D. Clarke

(57) ABSTRACT

A system and method is disclosed for monitoring human interactions, including transactions and communications, profiling the subject and objects in those interactions, and comparing subject profiles to profiles of subjects with known characteristics to determine whether the test subject is normal or abnormal subjects. The behavior data can be collected electronically in a virtual environment, such as a website, through video surveillance, card access, phone records, purchase histories, or any other consistent identified record of behavior. The invention has application in detecting various types of unusual and malicious activity, including spam, viruses, terrorism, identity theft, and money laundering, to name but a few applications.

20 Claims, 4 Drawing Sheets

SYSTEM AND METHOD FOR QUANTIFYING AND DETECTING NON-NORMATIVE BEHAVIOR

FIELD OF THE INVENTION

The present invention relates to automated analysis of human behavior and detection of abnormal behavior through the profiling of subject object interactions. Particularly, the invention relates to the representation of subject and object characteristics for purposes of assigning subjects and objects to behavioral clusters and characterizing such clusters by malicious intent or other behaviors of interest to the user of the system; and reverse modeling of subject or object profiles to demographic, psychological, physical, or other characteristics. The invention has application in detecting various types of unusual and malicious activity, including spam, viruses, terrorism, identity theft, and money laundering, to name but a few applications.

BACKGROUND OF THE INVENTION

The consumer faces a profound number of possible choices when selecting most kinds of products, be it movies, music, books, travel, art, dining, employers, and so on, to the extent that the consumer must choose from well-publicized possibilities, such as through advertising, or rely on recommendations of others. In the first case the set of choices is severely limited to those that can be promoted to a broad audience. In the second case the consumer must weigh the similarity of his or her own tastes to the person making the recommendation, whether it be an acquaintance or media. In addition, the number of possibilities and the cost of acquisition, both in terms of time and money, of assessing possibilities, make it infeasible to sample a large number of possibilities to determine which are of interest to the consumer.

Recommendation systems rely on trying to best match a person's individual preferences to the characteristics of the available items. In general what is known about the subjects and objects is the set of affinities between subjects and objects, where the affinity $\{A_{ij}\}$ between subject i and object j is determined by explicit feedback from the subject or inferred from the subject's interaction (or non-interaction) with the object. The consistency of the affinity scale from subject to subject and object to object derives from the consistency of the goal of the subjects in the given environment, for example to make a purchase in a commerce environment or to read articles in a content environment.

The primary goal of the recommendation system is to predict for a given subject those objects for which the subject will have the greatest affinity. In general the subject characteristics can be represented by a vector $S=(S_1, S_2, \ldots, S_L)$ and the object characteristics can be represented by a vector $B=(B_1, B_2, \ldots, B_M)$, whereby the predicted affinity of the subject to the object is a function $P=f(S, B)$. Various recommendation systems then differ in their representation of subject and object characteristics S and B and the similarity function f.

One method that has been used, commonly referred to as collaborative filtering, is to represent the subject as the set of object ratings that the subject has provided; i.e., $S=\{R_1, R_2, \ldots, R_L\}$, where $R_i$ is the subject's rating of object i. In most scenarios where recommendations are of use, the number of available items (e.g., such as catalog size) is going to be much larger than the number of items that have been rated by the subject, and so the set S is sparse. To generate a recommendation of a particular object to a particular subject, the subject's profile is compared to the profiles of other subjects that have rated the object. Given the similarities and dissimilarities of objects that have been rated in common, an estimate of the subject's response is generated. In a recommendation system, the system would generate estimates for a variety of objects rated by similar people and return as recommendations the objects with the highest predicted ratings.

Effectively, this type of system is a "mentored" system, whereby each subject is matched to a set of other subjects with similar tastes that have rated objects that the subject has not rated. This approach has several drawbacks, which include: recommendations can only be made where the subject's small set of mentors have provided coverage; the method is dependent on a class of users that have provided a large number of ratings (i.e., mentors), or else the system database must be searched to provide mentors appropriate to each requested object; the method is limited in capacity to make recommendations across various categories (cross marketing); the method does not make full use of all data for each subject (that is, the method is restricted to the subset of mentors); the representation of the subject, which is the set of ratings for each rated object, is not compact and increases linearly with the number of rated objects; subject representations are not portable to other recommendation systems; requires lengthy questionnaires to introduce a new subject into the system; and faces combinatorial challenges to find the best mentor for a given user and is therefore not scalable to large user populations.

Additional desired characteristics of a recommendation system that cannot be addressed by the mentor method include inverse modeling of subject representations back to physical attributes, such as demographics or psychographics, and identification and representation of object similarities.

Another approach is shopping basket analysis, which makes suggestions based on objects that have been purchased by other subjects at the same time as an object that has been selected by the targeted subject. However, this approach relies on transactional dependency and does not allow prediction of preference for objects that are not purchased together. In particular this method cannot associate subject/object affinities across catalog or across time as catalog items are replaced by similar items. Shopping basket analysis is also not specific to individual subjects, but rather to aggregate transaction histories across all subjects. By contrast, the present invention automatically normalizes all product profiles across product categories and can combine information across single vendor transaction histories.

Other approaches classify objects according to expert defined categories or attributes, whereby each object is rated by each attribute and then recommendations are made by matching the expressed interests of the subject to the attributes of the objects. Expert systems have the drawback that they are not self-adapting; that is, they require expert classification or coding. This means that such systems are specific to a single product domain. Also, because they are not data driven, they are not able to process large, diverse, and constantly changing transaction histories.

Predictive modeling techniques use demographics to model subjects. Not only are demographics an indirect substitute for aesthetic opinions and therefore inherently inaccurate, this is invasive of the subject's privacy and only specific to groups of subjects and not to individual subjects.

SUMMARY OF THE INVENTION

In accordance with the present invention, a method and system is presented for collecting subjects' affinities to objects, extracting subject and object profiles, and generating recommendations to subjects of objects that were rated by other subjects. This invention is sometimes referred to in this patent by its commercial trademarked name, Resonance®.

An object of the invention is to provide a means of recommending objects to subjects based on either explicit or behaviorally inferred ratings of other subjects of those objects and of commonly rated objects.

Another object of the invention is to compactly and uniformly represent subject and object profiles so that the affinity, or preference, of the subject to the object can be quickly and efficiently predicted, and so that the number of features in the profiles of the subjects and objects is not directly dependent on the number of subjects or objects in the system.

Another object of the invention is to create a representation of objects that is universal across all types of objects, so that all types of objects can be compared to one another and the subject's interaction with one set of objects can be extrapolated to other types of objects, and that the representation is derived solely from the collective interaction of subjects with the set of objects (catalog) and does not require detailed object information or expert knowledge of object characteristics.

Another object of the invention is to enable the use of all subject-object interactions, and not just, for example, purchase behavior, to form profiles of subject and objects for faster profiling and greater accuracy and responsiveness to temporal changes in site merchandising or customer behavior.

Another object of the invention is to create object profiles as well as subject profiles, so that objects can be readily indexed by aesthetic or other categories and so that objects can be readily associated across product categories by aesthetic similarity.

Another object of the invention is to create subject and object profiles that can be used to relate the derived aesthetic attributes to other objective measures of subjects, such as personality type or demographics, and objects, such as color or shape.

Another object of the invention is to collect ratings information from multiple applications while protecting the anonymity of the subject across different applications and minimizing the need to normalize object information (metadata) across catalogs.

Another object of the invention is to combine the recommendations of the system with explicit human merchandising objectives either through "hard" rules that filter results by specified criteria or "soft" rules that bias the results towards a defined business goal.

Another object of the invention is to provide recommendations to groups of subjects based on the best match to their collective profiles.

Another object of the invention is to enhance product and content marketing by characterizing the attributes of object profiles.

Another object of the invention is to identify appropriate subjects for the marketing of a particular object.

The present invention is a system and method for predicting subject responses to objects based on other subjects' responses to that and other objects. The process of matching subject and object profiles produces a predicted response score that can be used to rank recommended content. The scores can be used as is or combined with other business logic to render the final recommendation rank. The invention can be applied to a broad range of applications, including the retailing of single consumption items, such as non-recurring purchases or content views, where the previous purchase or view of an object cannot be used to predict additional purchases or views of the same object. The invention can also be used to predict subject responses to recurring purchases and to recommend new consumables.

The invention considers the interaction of subjects and objects. The subject is an active entity that initiates transactions. The subject consumes or experiences objects and provides feedback on the level of satisfaction with the object. The subject could be a single person or a corporate entity, such as a business. The object is a passive target of interaction by the subject. This could be a physical object, such as a consumer good, for example cars, MP3 player, or ice cream; media, such as music, movies, books, art, or plays; or even a person, as in the case of a job search or a matchmaking service. In the case of active entities, it is possible for the subject and object to reverse roles depending on the situation.

The invention provides a novel solution to the problem of how to identify objects, for example products, that will appeal to a particular subject, for example a person, where the large number of possible objects, including less desirable objects that are descriptively similar but aesthetically different or where some objects may appeal highly to a limited population of subjects while being undesirable to the broader population, makes it difficult for the subject to notice the objects that the subject wants simply by browsing the entire set of objects. This provides a breakthrough for target marketing and retail applications because it allows the consumer, solely by behavior, to "self-market" or "pull" those products which are of interest, rather than requiring that retailers "push" potentially unwanted products through advertising or other inefficient means.

The invention also addresses the issue of consumer privacy because it does not profile the consumer using personal demographics information, which consumers find both invasive and tedious to enter. Thus Resonance improves retailers' ability to target customers, while simultaneously making it easier for consumers to participate.

The invention works by forming profiles of subjects, for example consumers, and objects, such as goods or media, based on aesthetic evaluations of objects by subjects. The invention does not require a priori information about either subjects, such as demographics or psychographics, or objects, such as classifications or genres. Rather, it automatically generates representations of subjects and objects solely from the subjects' interaction with the objects. Because it creates its own abstract representation of subjects, it allows retailers to transparently target the subject without compromising subject privacy through the collection and modeling of sensitive personal information. The profiles can also be extended across catalogs, product or content domains, or across websites or stores.

Note that the identification of subjects and objects is not a physical one and may change depending on the application. For example, in a consumer movie recommendation application, the person requesting recommendations is the subject and the movie is the object. In a dating service application, a person would be considered a subject when searching for matches and an object when being searched by others. Similarly, in the case of employer/employee matching, companies and persons would alternate between the roles of subject and object. Note that in cases where an entity can assume different roles, a different profile would be created for each role.

Because the profiles are symmetric (both subjects and objects are profiled to the same representation), subjects can be matched to other subjects or objects, and objects can be matched to other objects or subjects. For example subject-subject matching could be used on a social networking site to connect people of like interests or on an online store to order product reviews according to the similarity of the reviewer to the reader. Similarly, object-object matching can be used to match keywords to products or content, advertisements to news articles, or promotional banners to referring affiliate sites.

Subjects and objects are represented as a set of derived abstract attributes, or feature vectors. In addition to driving the matching process, the distributions of the dimensions can be used to predict which items will evoke strong reactions (negative and positive) from a typical group of subjects and which items will evoke a more even response across those subjects.

The invention also relates to the field of neural networks and optimization. Generally, neural networks take an input vector through a transfer function to produce an output. Neural network training methods are classified into supervised and unsupervised models. In supervised models the training method adapts the weights of the transfer function to minimize some function of the outputs, such as the mean squared error between the outputs produced by the transformation of the inputs and the expected outputs, which are known for a certain set of inputs commonly known as the training set. Once the weights have been trained, the network can be used to predict outputs for operational inputs. In unsupervised networks the data is clustered in some way that makes it useful for subsequent processing; however, the desired result, namely the closest matching template, is not known during training.

The proposed method is supervised insofar as the desired outputs are known as part of a training set; however, similar to unsupervised methods, the method is also self-organizing insofar as the inputs are not known; i.e., the method derives the input values using a known transfer function and known outputs.

Because of the large number of weights or adapted parameters of the system, which scales as the number of subjects and objects, a key aspect of the method is that the weights for each subject or object are decoupled from other subjects and objects when updated separately. This allows individual subjects and objects to be trained by different processing units, which allows the method to scale up to large numbers of subjects and objects, which may ultimately total millions or tens of millions or more.

A key improvement of the invention over other collaborative filters is that it creates not just profiles of the subjects, but profiles of the objects as well. This provides several advantages, including rapid and scalable prediction of subject to object affinities; straightforward cross marketing across product categories; and sorting of objects by aesthetic categories for purposes of browsing and selecting items for consumption or association, such as selecting musical recordings to go with a movie production.

DETAILED DESCRIPTION OF THE DRAWINGS

Figure 1:
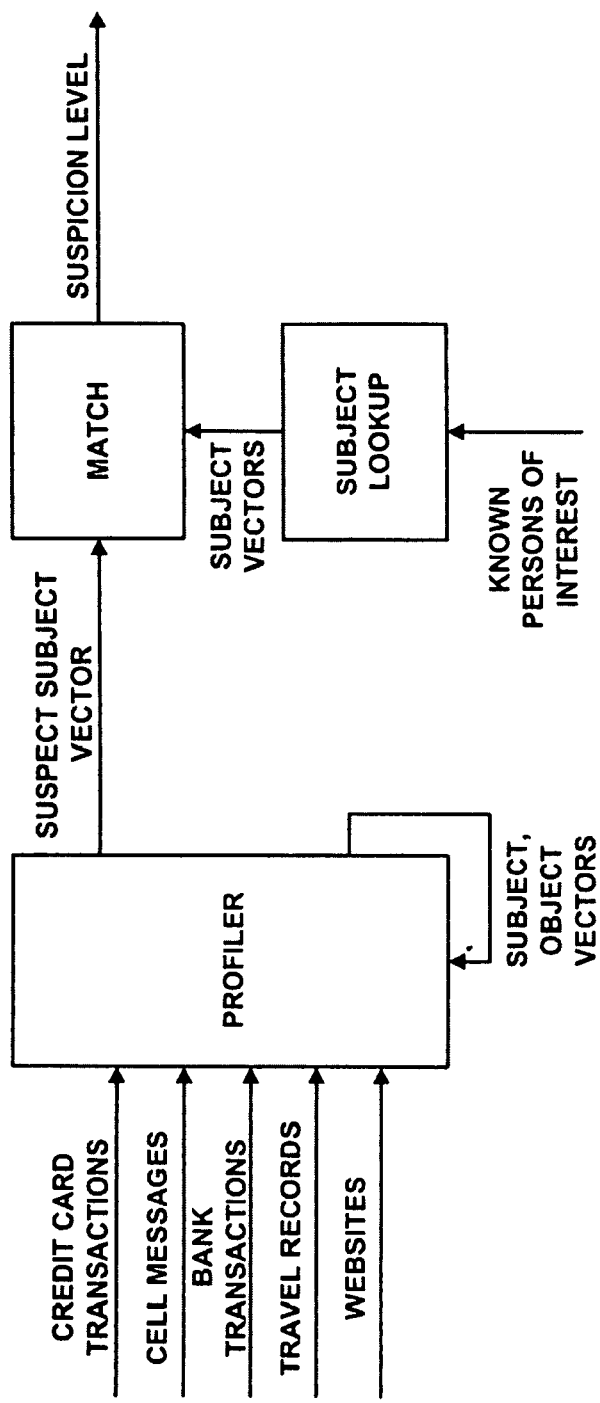
FIG. 1 shows the operation of the system as a person-of-interest detection system.

The following detailed description is related to the technology disclosed in U.S. patent application Ser. No. 12/415, 758 filed on Mar. 31, 2009 and U.S. patent application Ser. No. 12/416,005 filed on Mar. 31, 2009, and both are incorporated by reference herein, in its entirety. FIG. 1 shows the operation of the system as a person-of-interest detection system. In this embodiment the objects of the system include a combination of physical and virtual entities, including goods, including but not limited to consumer products; locations, such as neighborhoods, cities, states, and countries; businesses, including banks, restaurants, clubs, and other member associations; websites; phone numbers; and any other discrete entity that involves interaction from different subjects and can be identified and extracted from a variety of transaction flows, including credit card transactions, cell phone messages, bank transactions, travel records, and website browsing. This information is profiled to produce both object vectors for the above entities and subject vectors for the persons involved in the transactions, as previously described in U.S. patent application Ser. No. 12/415,758 filed on Mar. 31, 2009 and U.S. patent application Ser. No. 12/416,005 filed on Mar. 31, 2009. Once the profiling is complete, the subject vectors can be fed through a filter that matches the subject vector of a subject against the profiles of known persons of interests. A high match with a known person of interest, which is defined as the suspicion level, indicates that the suspect should be investigated further, while a low match, or suspicion level, indicates that the suspect is not likely to be a person of interest. Alternatively, the suspect could be tested against a population of normal subjects, in which case a high match would indicate that the suspect was normal and a low match would indicate that the suspect is not normal and therefore suspicious. Note that the system operates entirely on the objects involved in the transactions and does not require translation or parsing of the messages. This allows the system to automate the screening process to cover a large population of potential suspects. The profiling is based on first generating similarity measures based on both time and subject correlations. Once the similarities have been generated between the various objects, the subject vector is determined as a fit to the object characteristics, as described elsewhere in this patent and previously described in U.S. patent application Ser. No. 12/415,758 filed on Mar. 31, 2009 and U.S. patent application Ser. No. 12/416,005 filed on Mar. 31, 2009.

Figure 2:
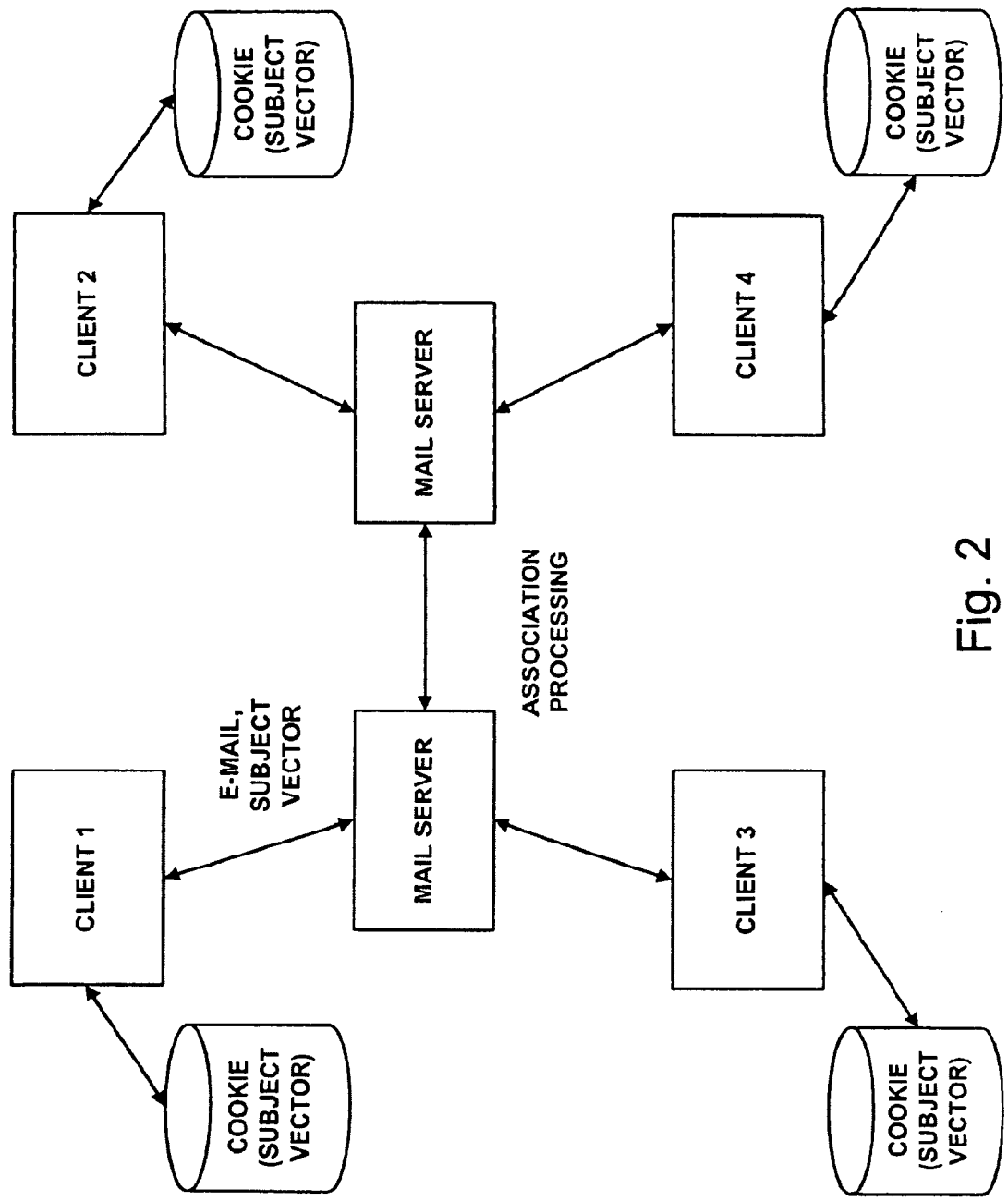
FIG. 2 shows an embodiment of the system to profile e-mail users for spam filtering.

FIG. 2 shows an embodiment of the system to profile e-mail users for spam filtering. The e-mail clients interact with each other by sending e-mails through various e-mail servers, which route the e-mail from one client, designated as the sender, to the other client, designated as the recipient. The e-mail servers profile the e-mails and update the sender and recipient's profiles based on the correlation between users and e-mail types. Each e-mail client application has its own cookie or other local storage that stores the profile of the e-mail user.

Figure 3:
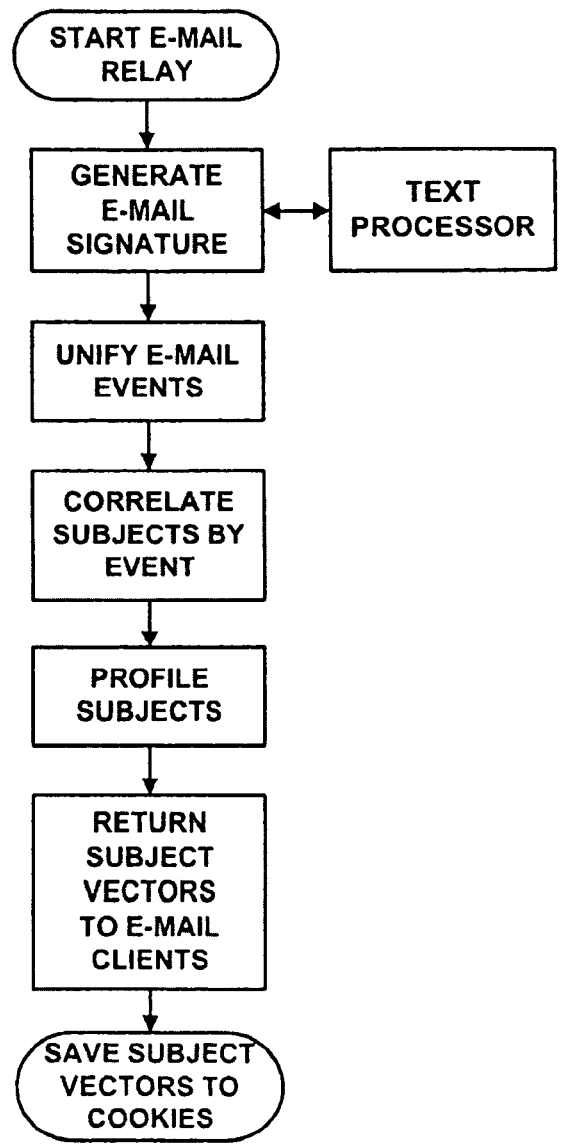
FIG. 3 shows the workflow for profiling e-mail and e-mail senders and recipients.

FIG. 3 shows the workflow for profiling e-mail and e-mail senders and recipients. The profiling is performed as part of the process of sending e-mail. The process starts with the uploading of the e-mail from the client to the server. The body of the e-mail is processed to create a signature for the e-mail, for example based on word frequency, excluding trivial words like indefinite articles. The e-mail signature reduces the large number of different e-mails into a smaller number of e-mail types or categories. The sender and recipient are then profiled based on their interaction with these different e-mail types and the updated subject profiles are sent back to the e-mail clients to be stored locally.

Figure 4:
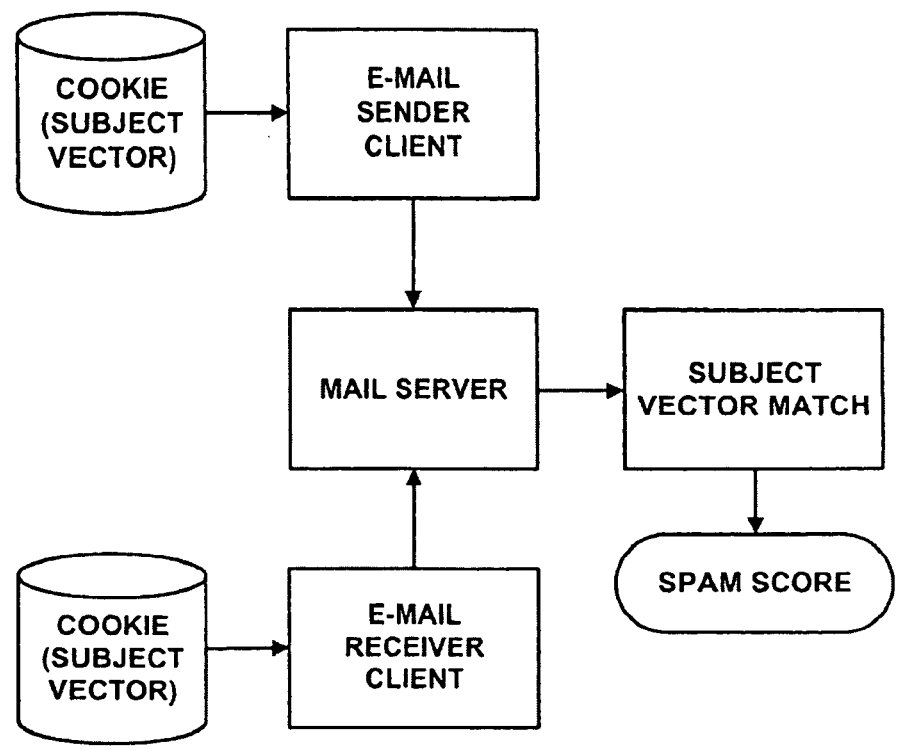
FIG. 4 shows the operation of the system to detect spam based on matching the e-mail sender and recipient profiles.

FIG. 4 shows the operation of the system to detect spam based on matching the e-mail sender and recipient profiles.

When an e-mail is sent, the sender's profile cookie, that is its subject vector, is also included with the e-mail payload. When this reaches the recipient, the recipient's e-mail profile is matched to the sender's e-mail profile. If the match is high, then the sender and recipient are considered compatible and the spam score is low. However, if the match is below the detection threshold, then the sender is considered incompatible and the e-mail is flagged as spam.

The above application embodiments are for example only. The invention does not restrict the design and implementation of the application in any way, as long as the interface to the recommendation engine matches the protocols defined by the interface guidelines. A key aspect of the invention is that, unlike other methods, it does not in fact require knowledge of the subject or object characteristics and does not need to parse the application's content. Instead, the system self-derives and represents the characteristics of subjects and objects so that they can be matched against other populations of subjects and objects.

The foregoing description of a preferred embodiment has been presented by way of example only, and should not be read in a limiting sense. The scope of the present invention is defined only by the following claims.

In the claims reference characters used to designate claim steps are provided for convenience of description only, and are not intended to imply a particular order for performing the steps.

What is claimed is:

1. A system for quantifying and detecting non-normative behavior, comprising:
    a web-based service system to collect, profile, and assess subject object behavior, said system being configured to:
    (a) identify objects as discrete entities that involve interactions from different subjects and are extractable from on-line transaction events;
    (b) represent the similarity between two objects by coincidence in time by subject of the corresponding transaction events of those objects, aggregated across all subjects;
    (c) represent said objects in vector form;
    (d) aggregate transaction events by subject to determine the subject's affinity to each object that the subject has interacted with:
    (e) represent, in vector form, subjects identifying individuals involved in transactions involving said objects;
    (f) filter by matching a vector of a subject against subject vectors of persons of interest;
    (g) determine a threshold to assess said matching falls within a pre-set detection range; and
    (h) trigger further investigation or testing against a population of normal subjects when said matching falls within said pre-set detection range, whereby said system quantifies and detects a non-normative behavior of said subject by applying a suspicion threshold, and
    further whereby the subject vector and the object vector each have a respective number of dimensions; and
    further whereby the predicted similarity of one object to another object is calculated by matching their object vectors; and
    further whereby the system is configured to generate the object vectors by producing object vectors having respective initial dimensions, to determine predicted similarity values based on the initial object vectors, and to calculate a cost function that measures the difference between the predicted similarity values and the said similarity between two objects by coincidence in time by subject; and
    further whereby the system iteratively increases the dimensions of the generated object vectors, and recalculates the cost function based on the differences between the predicted similarity values and actual similarity values, until the cost function reaches a predetermined value, and wherein the actual similarity values are based on said transaction events; and
    further whereby the system is configured to generate the subject vectors from the said object vectors and said affinities derived from said transaction events.

2. The system for quantifying and detecting non-normative behavior, according to claim 1, wherein said objects in vector form provide a common, universal representation across all types of said objects, whether physical or virtual.

3. The system for quantifying and detecting non-normative behavior, according to claim 2, wherein said interactions are e-mail messages, and wherein said system is configured to profile of said objects without the classification, parsing or translation of said e-mail messages.

4. The system for quantifying and detecting non-normative behavior, according to claim 1, wherein determine said threshold includes automated detection by matching subject vectors and applying a suspicion threshold matching metric including a dot product or Euclidean distance matching metric.

5. The system for quantifying and detecting non-normative behavior, according to claim 1, wherein subject and object vectors derived solely from said subject's transactions involving said objects comprise subject object interactions including:
    credit card transactions;
    consumer products;
    locations;
    businesses;
    websites,
    phone numbers; and
    any other discrete entity that involves interaction from different subjects and is identified and extracted from a variety of transaction flows, including said credit card transactions, cell phone messages, bank transactions, travel records, and website browsing.

6. The system for quantifying and detecting non-normative behavior, according to claim 1, wherein profiling subject object behavior includes profiling subject e-mail behavior.

7. The system for quantifying and detecting non-normative behavior, according to claim 6, wherein said profiling of subject e-mail behavior includes determinations of e-mail signatures or categorizations based on word frequency.

8. The system for quantifying and detecting non-normative behavior, according to claim 6, wherein a profile of said subject is stored locally in the subject's e-mail client application.

9. The system for quantifying and detecting non-normative behavior, according to claim 1, wherein determine said threshold to assess whether said matching falls within said pre-set detection range includes profile matching compatibility thresholding employing a comparison against said population of normal subjects and testing for mismatch.

10. The system for quantifying and detecting non-normative behavior, according to claim 1, wherein determine said threshold to assess whether said matching falls within said pre-set detection includes profile matching compatibility thresholding employing a comparison against a non-normal population and testing for match.

11. A method for quantifying and detecting non-normative behavior, comprising the steps of:
(a) providing a service system to collect, profile, and assess subject object behavior, said system identifying objects as discrete entities that involve interactions from different subjects and are extractable from on-line transaction events;
(b) representing the similarity between two objects by coincidence in time by subject of the corresponding transaction events of those objects, aggregated across all subjects;
(c) providing objects represented in vector form;
(d) aggregating transaction events by subject to determine the subject's affinity to each object that the subject has interacted with;
(e) providing subject vectors derived solely from said subject's transactions with said objects;
(f) filtering by matching a vector of a subject against subject vectors of persons of interest;
(g) determining a threshold to assess whether said matching falls within a pre-set detection range; and
(h) triggering further investigation or testing against a population of normal subjects when said matching falls within said pre-set detection range,
whereby said method quantifies and detects non-normative behavior by applying a suspicion threshold, and
further whereby the subject vector and the object vector each have a respective number of dimensions; and
further whereby the predicted similarity of one object to another object is calculated by matching their object vectors; and
further whereby object vectors are generated by producing object vectors having respective initial dimensions, to determine predicted similarity values based on the initial object vectors, and to calculate a cost function that measures the difference between the predicted similarity values and the said similarity between two objects by coincidence in time by subject; and
further whereby the dimensions of the generated object vectors are iteratively increased, and the cost function is recalculated based on the differences between the predicted similarity values and actual similarity values, until the cost function reaches a predetermined value, and wherein the actual similarity values are based on said transaction events; and
further whereby the subject vectors are generated from the said object vectors and said affinities derived from said transaction events.

12. The method for quantifying and detecting non-normative behavior, according to claim 1, wherein said step of providing objects represented in vector form comprises providing object vectors generating a common, universal representation across all types of said objects, whether physical or virtual.

13. The method for quantifying and detecting non-normative behavior, according to claim 1, wherein said interactions are e-mail messages, and wherein said step of identifying objects includes the step of subject and object profiling using said subject and object vectors derived solely from said subject's interactions with said without the classification, parsing or translation of said e-mail messages.

14. The method for quantifying and detecting non-normative behavior, according to claim 11, wherein said step of determining a includes the step of determining a threshold whether said matching falls within a pre-set detection range includes automated detection by matching said subject vectors and applying to a suspicion threshold a matching metric including a dot product or Euclidean distance matching metric, and wherein said subject and object vectors derived solely from said subject's interactions with said objects include subject object interactions including:
credit card transactions;
consumer products;
locations;
businesses;
websites;
phone numbers; and
any other discrete entity that involves interaction from different subjects and can be identified and extracted from a variety of transaction flows, including said credit card transactions, cell phone messages, bank transactions, travel records, and website browsing.

15. The method for quantifying and detecting non-normative behavior, according to claim 1, wherein said step of threshold determining includes the step of profiling subject object behavior, and wherein said objects include e-mails.

16. The method for quantifying and detecting non-normative behavior, according to claim 15, wherein said step of profiling subject object behavior further includes the step of profiling subject e-mail behavior, wherein said step of profiling subject e-mail behavior includes determinations of e-mail signatures or categorizations based on word frequency, and wherein a profile of said subject is stored locally in the subject's e-mail client application.

17. The method for quantifying and detecting non-normative behavior, according to claim 11, wherein said step of determining a threshold includes the step of determining a threshold to assess whether similarity between said subject and said population of normal subjects is within said pre-set detection range, wherein determining said threshold includes profile matching compatibility thresholding employing a comparison against said population of normal subjects and testing for mismatch.

18. The method for quantifying and detecting non-normative behavior, according to claim 1, wherein said step of determining a threshold includes the step of determining a threshold to assess whether similarity between said subject and said population of normal subjects is within said pre-set detection range, wherein determining a threshold includes profile matching compatibility thresholding employing a comparison against a non-normal population and testing for match.

19. A method for using a system for quantifying and detecting non-normative behavior, comprising the steps of:
(a) collecting subject object behavior;
(b) profiling subjects and objects by generating subject and object vectors;
(c) matching test subject profiles to target population subject profiles; and
(d) detecting abnormality according to comparison of test target match to a pre-set detection range,
whereby behavior data is collected electronically in an environment that provides a consistent record of behavior, said environment comprising a website, video surveillance, card access, phone records, or purchase histories, and
further whereby the subject vector and the object vector each have a respective number of dimensions; and
further whereby the predicted similarity of one object to another object is calculated by matching their object vectors; and
further whereby object vectors are generated by producing object vectors having respective initial dimensions, to determine predicted similarity values based on the initial object vectors, and to calculate a cost function that measures the difference between the predicted similarity values and the said similarity between two objects by coincidence in time by subject; and further whereby the dimensions of the generated object vectors are iteratively increased, and the cost function is recalculated based on the differences between the predicted similarity values and actual similarity values, until the cost function reaches a predetermined value, and wherein the actual similarity values are based on said transaction events; and further whereby the subject vectors are generated from the said object vectors and said affinities derived from said transaction events, and without parsing transaction contents, all accomplished in a non-invasive, mentor-less fashion and being scalable to large numbers of said subjects and said objects.

20. The method for using a system for quantifying and detecting non-normative behavior, according to claim 19, wherein said step of detecting abnormality further includes the step of detecting:
(a) spam e-mail; and
(b) a person or persons of interest.

* * * * *